Patented Feb. 3, 1925.

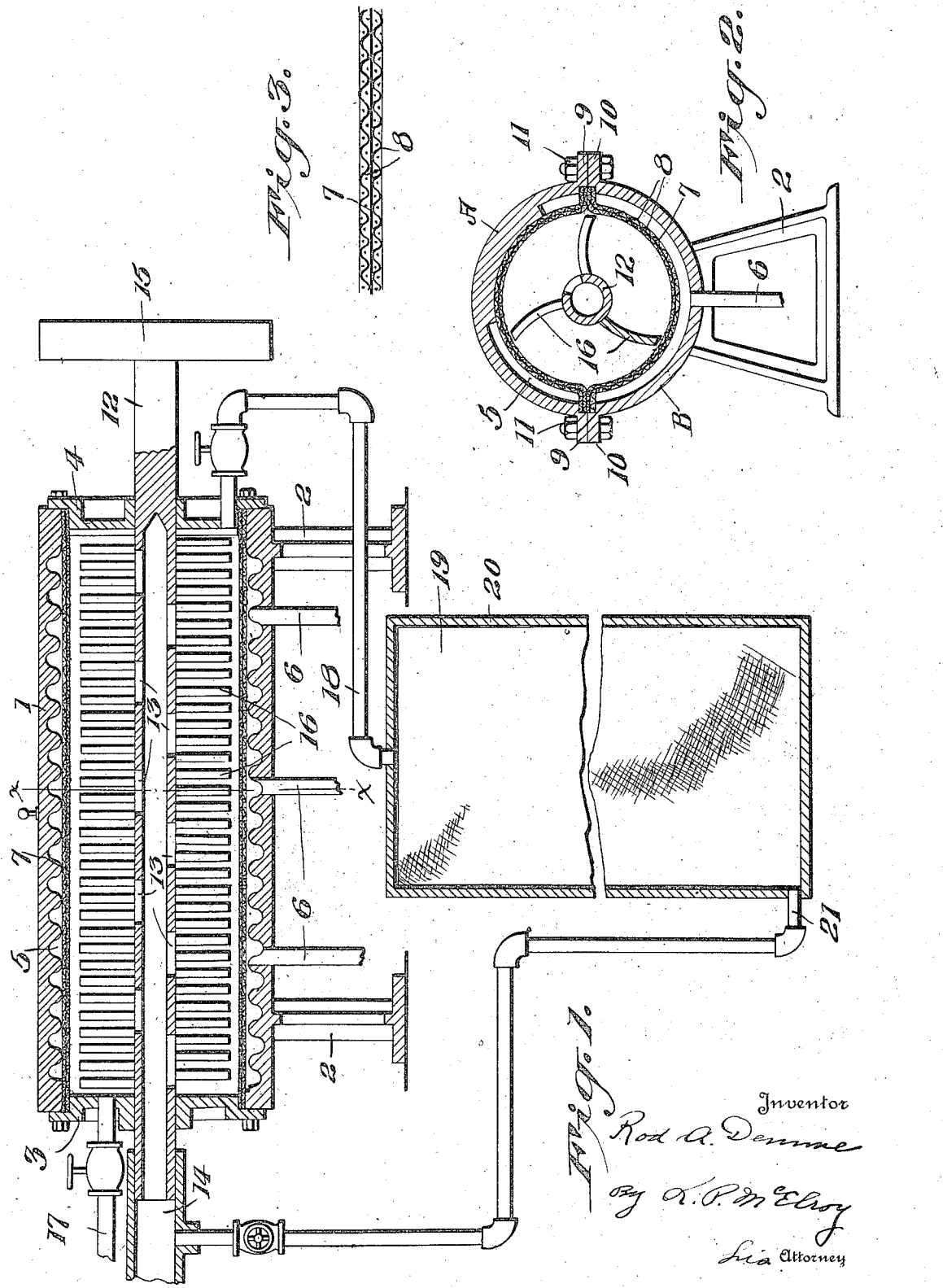

1,524,916

UNITED STATES PATENT OFFICE.

ROD A. DEMME, OF NEW YORK, N. Y., ASSIGNOR, BY MESNE ASSIGNMENTS, TO DARCO CORPORATION, OF WILMINGTON, DELAWARE, A CORPORATION OF DELAWARE.

FILTERING PROCESS AND APPARATUS THEREFOR.

Application filed July 13, 1920. Serial No. 396,036.

*To all whom it may concern:*

Be it known that I, ROD A. DEMME, a citizen of Switzerland, residing at New York, in the county of New York and State of New York, have invented certain new and useful Improvements in Filtering Processes and Apparatus Therefor, of which the following is a specification.

This invention relates to filtering processes and apparatus therefor; and it comprises a method of rapidly and cleanly filtering liquid under pressure wherein the pressure is localized next the filtering surface, as by operating upon such liquid in a cylindrical filter having a rotating device of the nature of the rotors of centrifugal pumps, producing a pressure having its maximum next the inner face of said filter; and it further comprises a cylindrical drum, filtering means on its inner periphery, a rotary pressure-producing device within the filtering means, and means for supplying liquid to the drum and means for removing liquids therefrom; all as more fully hereinafter set forth and as claimed.

For manufacturing purposes forced filtration is generally done in filter presses operating under pump pressure; the pump creating a pressure sufficiently heavy to force the liquid to be filtered through a filter cloth or the like. In such an apparatus the least pressure is at the point where pressure does useful work, namely the filtering surface, whereas the greatest pressure is in the pump; the discrepancy increasing as the operation goes on and the press cake builds up, adding its own resistance to the friction in the pipes, etc., necessitating more pressure in the pump. In most cases where the quantity of liquor to be filtered is large, and particularly with thick or viscous liquids, the pressure required is quite high and it also must be maintained over relatively long periods of time. With some liquids, and notably glue and gelatin solutions, this continuance of high pressure is detrimental. In operating a filter press under pump pressure it may be said that practically only a relatively small fraction of the total initial pressure generated by the external pump is effective on the actual filter face and useful in forcing the liquor through the filter cloth.

In the present invention I obviate these difficulties by generating the filtering pressure at, or approximately at, the filtering face itself. I make the source of pressure an integral part of the filter itself; employing it to produce a centrifugal action confining the pressure to the region where such pressure is useful, i. e., at the filter face. In practice, I provide a drum-like casing, advantageously capable of disassemblage into arcuate parts, and provide its inner periphery with a filter cloth or other filtering medium. Within the drum and traveling in proximity to the filter face, I provide a rotary element analogous to the rotor of a centrifugal pump. This operates to produce a maximum pressure at or near the filter face; and the effective path of travel of liquid under high pressure in filtration is kept down to a very small distance, instead of a great many feet, as is often the practice in the use of filter presses. In so operating, instead of the pressure increasing with the distance from the filter face, the converse is true; the maximum pressure required to force the liquor through the filtering fabric is at, or practically at, the face of such fabric. The liquor to be filtered is therefore exposed to the maximum filter pressure only for the briefest interval prior to being discharged through the filter cloth. In practice I maintain a flow of liquid through the filtering device and past the filtering face, discharging such liquid as does not pass through the filter fabric. In so doing, the period of exposure to high pressure of the liquor in filtering through the fabric is also very brief. The solids removed in the filtering action go forward with the passing liquor and from it they may be removed in various ways to produce a liquor of about the composition of that originally treated; and this liquor may be sent back through the operation. For example, the passing liquor may be strained through a bag filter or the like and the strained liquor returned to the inlet of the apparatus for repassage together with fresh liquor.

My invention may take various mechanical embodiments. One convenient arrangement is illustrated in the accompanying drawings. In this showing Figure 1 is a view in central longitudinal vertical section, certain parts being shown in elevation;

Figure 2 is a transverse vertical section along lines x—x of Figure 1; and

Figure 3 is a detail of a filtering screen.

In this showing, element 1 is a 2-part cylindrical casing mounted on standards 2 and closed at the ends by disk elements 3 and 4. Interiorly, the periphery of the drum is provided with suitable grooves 5 leading to discharge outlets 6. Resting on this grooved and corrugated surface is a filter cloth or the like. As shown (see Figure 3), I protect the filter cloth 7 on each side by a metal filtering screen 8 of wire cloth or perforated metal. At the ends the cloth is held between the ends of the cylinder and the end disks. It is convenient to make the casing in 2-parts, A and B, flanged together (see Figure 2) at 9 and 10. The filter cloth and screen similarly may be made in two sections with the ends held between flanges 9 and 10; or it may be one piece of material with a fold on one side and the lapped ends at the other. As will be observed, by removing bolts 11 the whole structure can be readily disassembled; the top being lifted off and the filter screens taken out. As shown, within the cylinder is a rotatable shaft 12 which may be hollow and serve as a feeding means for liquor to be treated, being provided with orifices 13 for that purpose. As shown, it is journaled at one end in stationary tubular feeding means 14, the other end being, as shown, provided with driving means 15. The shaft carries a plurality of closely associated vanes 16. Instead of feeding liquor into the device through the tubular shaft as shown, feed may be had through the valved inlet 17 passing through one of the end closures. Outflow may be through valved outlet 18 which, as shown, leads to a coarse open-meshed filter cloth or coarse straining fabric 19 arranged for instance as a bag filter in casing 20. Strained or separated liquor from this casing may be returned through 21 to the inlet of the device. In treating hot liquors, the whole device may be steam jacketed or otherwise heated.

For the sake of simplicity of illustration, but one device is shown; but it is obvious that a plurality may be used and connected in series.

Presuming the structure shown is to be used with a liquor carrying solids which are to be removed, the liquor to be treated passes in through 14 (or 17). The vanes 16 being in rapid rotation, centrifugal pressure is produced next the inner periphery of the cylinder; that is, next the filter member proper. The pressure is the most intense at this point. Liquid passes through and emerges at 6. Usually I manage the feed so that more liquid passes into the cylinder in a time interval than is discharged at 6. The residue passes out through 18 and is strained at 19 to bring the proportion of liquids and solids nearer that of the original liquid. Naturally the liquid passing out at 18 carries a greater proporation of solids than that entering at 14. With the connections as shown, the liquid strained into 20 will be drawn back by the suction of the device through 21 for repassage together with fresh liquor going through 14. All the solids in the liquid treated in the end accumulate at 19 except the small amount on the inner face of the filter member. The filter member therefore may be used for an indefinitely long period.

What I claim is:—

1. In filtration, the process which comprises feeding liquids into a stationary annular filter and producing pressure of said liquid against the filter face by rapid rotation of a vane in the liquid in proximity thereto.

2. In filtration, the process which comprises feeding liquids into a stationary annular filter, producing pressure of said liquid against the filter face by rapid rotation of a vane in proximity thereto, the feed of liquid being greater than the speed of discharge through the filter, removing the excess of liquid together with solids carried thereby, straining out solids from the excess and repassing the strained liquid into the filter together with fresh liquid.

3. In a filter, a stationary casing, annular filtering means therein, means for collecting and removing liquid passing through the annulus, a revoluble, hollow perforated shaft within the annulus, means for supplying liquid to be filtered thereto and vanes mounted on the shaft, the ends of said vanes terminating near the inner surface of the annulus.

4. In a filter a stationary casing, annular filtering means on the inner wall thereof, means for feeding liquid within the annulus, a shaft carrying vanes within the annulus, means for removing filtered liquid, means for removing unfiltered liquid carrying solids in suspension, means for straining the unfiltered liquid and means for returning the strained liquid for repassage.

5. In a filter, a stationary drum comprising two arcuate sections flanged together, a filtering medium disposed on the inner wall of the drum and held by the flanged connections, end plates for the drum, a hollow revoluble shaft journaled through the end plates, vanes carried by the shaft and terminating near the filtering medium, means for supplying liquid to the shaft and means for removing filtered liquid.

6. In a filter, a stationary drum comprising two arcuate sections flanged together, a filtering medium disposed on the inner wall of the drum and held by the flanged connections, end plates for the drum, a hollow revoluble shaft carrying vanes and journaled through the end plates, said shaft having liquid delivering openings, means for supplying liquid to be filtered to the hollow shaft and means for removing filtered liquid.

7. In a filter, a stationary drum comprising two arcuate sections flanged together, a filtering medium disposed on the inner wall of the drum and held by the flanged connections, end plates for the drum, a hollow revoluble shaft carrying vanes journaled through the end plates, said shaft having liquid delivering orifices, means for supplying liquid to be filtered to said shaft, means for removing filtered liquid, means for removing liquid carrying solids in suspension from the drum, straining means for removing solids from such removed liquid and a connection for delivering strained liquid back to said hollow shaft for repassage together with fresh liquid.

In testimony whereof, I affix my signature hereto.

ROD A. DEMME.

Witnesses:
JESSIE SEIDENBERG,
GEO. L. HOXIE.